ated Patent

United States Patent [19]
Nearen et al.

[11] Patent Number: 4,776,730
[45] Date of Patent: Oct. 11, 1988

[54] SYSTEM AND METHOD FOR MANAGING FLY ASH TRANSPORT AND VALVE FOR USE THEREIN

[76] Inventors: William F. Nearen, 445 Church St., Bullhead City, Ariz. 86442; Leslie G. Hughes, 3147 Suffock, Kingman, Ariz. 86401

[21] Appl. No.: 36,297

[22] Filed: Apr. 9, 1987

Related U.S. Application Data

[63] Continuation of Ser. No. 6,486, Jan. 28, 1987.

[51] Int. Cl.$^4$ ............................................. B65G 53/36
[52] U.S. Cl. ..................................... 406/124; 406/125; 406/128; 406/136; 137/625.19
[58] Field of Search ............... 406/122, 123, 124, 125, 406/126, 127, 128, 136, 138, 146, 10, 12, 28, 29, 26, 19; 137/625.19

[56] References Cited

U.S. PATENT DOCUMENTS

| | | |
|---|---|---|
| 1,188,085 | 3/1915 | Krupp . |
| 1,309,018 | 11/1918 | Conlon . |
| 1,327,252 | 3/1918 | Paulson . |
| 1,806,845 | 2/1929 | Dwyer . |
| 1,979,320 | 11/1934 | Domina ........................ 406/124 X |
| 2,129,231 | 8/1936 | Parker . |
| 2,637,342 | 10/1948 | Shannon . |
| 3,499,467 | 3/1970 | McCord et al. ................ 137/625.19 |
| 4,118,075 | 10/1978 | Lubbehusen .................... 406/125 X |
| 4,355,659 | 10/1982 | Kelchner ........................ 137/625.19 |

Primary Examiner—Galen Barefoot
Assistant Examiner—Paul E. Salmon
Attorney, Agent, or Firm—Sheldon & Mak

[57] ABSTRACT

A system and method for the transport of fly ash and other particulate matter. The system comprises (a) a fly ash hopper; (b) a metering container for measuring the amount of fly ash to be transported; (c) a first valve for regulating the movement of fly ash between the hopper and the metering container; (d) a transport line for transporting fly ash out of the metering container; (e) a second valve for regulating the movement of fly ash between the metering container and the transport line; (f) a third valve for regulating venting and pressurization of the metering container; and (g) means for moving the plug between first and second positions, the movement means being in physical communication with the third valve. The third valve comprises (i) a valve body having a bore and five ports in communication with the bore; (ii) a valve plug movably mounted in the bore between the first and second positions; and (iii) sealing means for preventing fluid passage out of the bore other than through the ports. When the plug is moved into the first position, pressurization gas can flow into a first port, through a first passage, and out a second port into the metering container to fluidize fly ash therein so that fly ash can drop out of the hopper, through the first valve, and into the metering container. Passage of pressurization gas through a third port is prevented and gas in the metering container is vented through a fourth port, through a second passage, and through the fifth port into the hopper to allow fly ash to flow into the metering container. When the plug is moved to a second position in the valve body, gas passage is prevented through the second, fourth and fifth port. Pressurization gas flows into the first port, through a third passage, and out the third port into the metering container to pressurize the metering container and fluidize the ash so that the fly ash drops out of the metering container and into the transport line when the second valve is open.

11 Claims, 2 Drawing Sheets

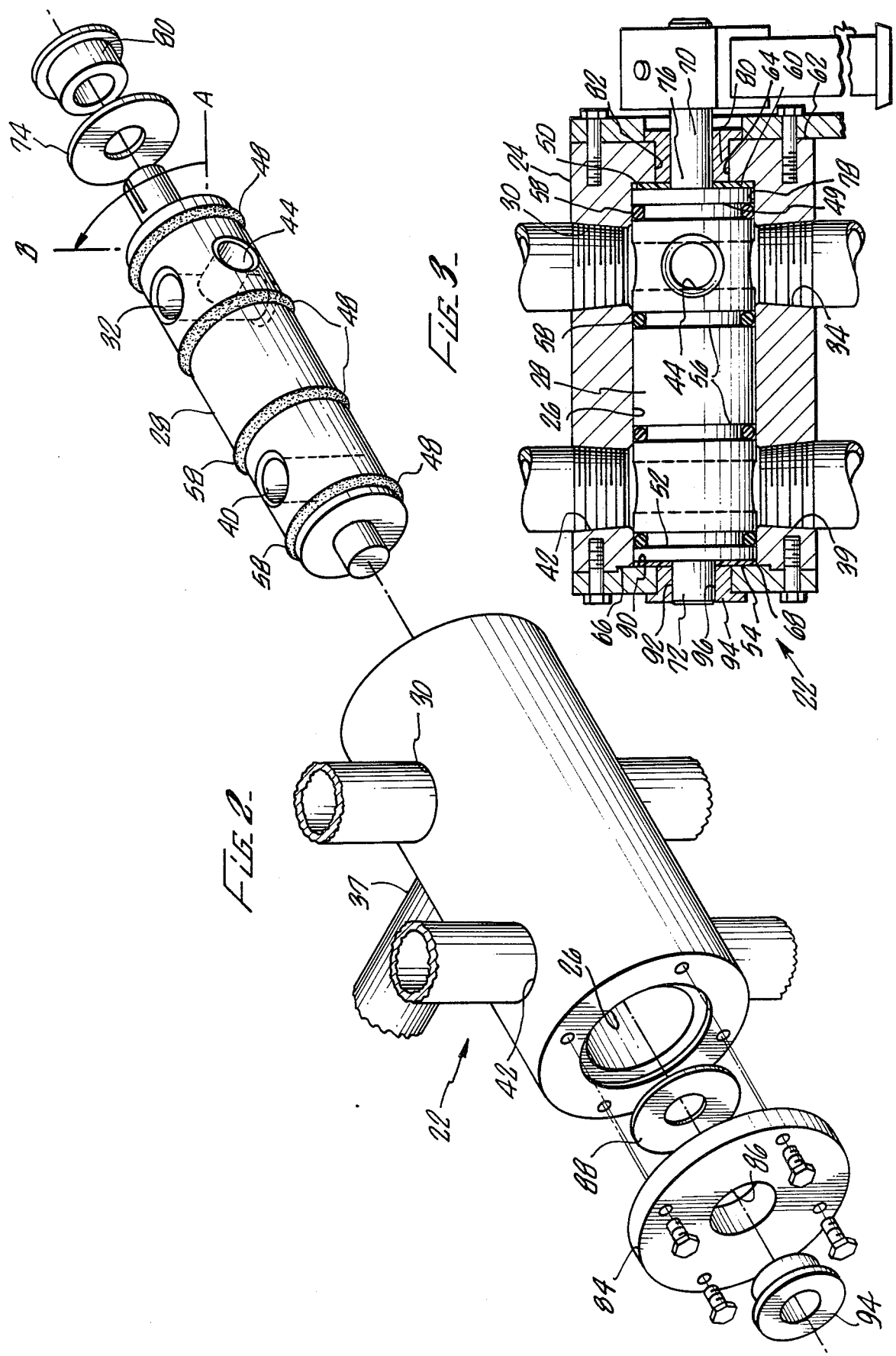

SYSTEM AND METHOD FOR MANAGING FLY ASH TRANSPORT AND VALVE FOR USE THEREIN

This is a continuation of application Ser. No. 006,486, filed Jan. 28, 1987.

BACKGROUND

The present invention is directed to a five-way valve and, in particular, to a system and method employing the five-way valve for the transport of particulate matter In a commercial power generating station, fly ash transport is typically managed by a system which comprises a fly ash hopper, a metering container for measuring the amount of fly ash to be transported, a first valve for regulating the movement of fly ash between the hopper and the metering container, a transport line for transporting fly ash out of the metering container, a second valve for regulating the movement of fly ash between the metering container and the transport line, and a five-way, triple diaphragm operated valve for regulating venting and pressurization of the metering container.

This five-way, triple diaphragm operated valve has many drawbacks. For example, the five-way, triple diaphragm valve has over two dozen critical and maintenance intensive parts and thus frequently requires expensive and time-consuming maintenance. In addition, the valve can only be replaced if the fly ash transport system is shut down for safety precautions. Replacement time (not including the time necessary to also inspect and repair the valve) is on the order of two to four man hours. Replacement also requires disconnecting five joints in order to remove the entire valve from the transport system. The five-way, valve is also undependable because usually within six months after installation the ash transport system experiences slower ash transfer, and after one year the valve must be replaced.

Accordingly, there is a need for a system and method for managing the transport of fly ash which is highly reliable and easy to maintain.

SUMMARY

The system and method of the present invention for managing the transport of fly ash satisfies this need. The system and method employ a valve which is highly reliable and is easy to maintain.

The system of the present invention for managing the transport of fly ash comprises (a) a fly ash hopper; (b) a metering container for measuring the amount of fly ash to be transported; (c) a first valve for regulating the movement of fly ash between the hopper and the metering container; (d) a transport line for transporting fly ash out of the metering can; (e) a second valve for regulating the movement of fly ash between the metering container and the transport line; (f) a third valve for regulating venting and pressurization of the metering container; and (g) means for moving a plug inside the third valve between a first and second position, the moving means being in physical communication with the third valve.

The third valve employed in the system of the present invention comprises (i) a valve body having a bore and five ports in communication with the bore; (ii) the plug movably mounted in the bore between the first and second positions; and (iii) sealing eeans for preventing fluid passage out of the bore other than through the ports. The plug has five passages therethrough. When the plug is in the first position (A) pressurization gas flows into a first port through a first passage, and out a second port into the metering container to fluidize fly ash therein so that fly ash drops out of the hopper through the first valve, and into the metering container, (B) passage of pressurization gas through a third valve is prevented, and (C) gas in the metering container is vented through a fourth port, through a second passage and through the first port into the hopper to allow fly ash to flow into the metering container. When the plug is moved into a second position. (A) gas passage is prevented through the second, fourth, and fifth ports and (B) pressurization gas flows into the first port, through the third passage, and out the third port into the metering container to pressurize the metering container and fluidize the ash so that the fly ash drops out of the metering container and into the transport line when the second valve is opened.

In an exemplary valve of the present invention, the first port and second ports are diagonally located from each other, the third port is located between the first and second ports, and the fourth and fifth ports are diagonally located from each other. Because of manufacturing considerations, it is preferred that the third port be located equidistant between the first and second ports and that the first, second, fourth, and fifth port be substantially coplanar. The plug and the bore of an exemplary valve of the present invention can have a cylindrical or a conical shape.

An exemplary sealing means employed in the valve of the present invention comprises (a) a first peripheral groove in the plug, the first peripheral groove being located between a first end of the plug and the first, second, and third ports; (b) a second peripheral groove in the plug, the second peripheral groove being located between a second end of the plug and the fourth and fifth ports; (c) at least one peripheral groove in the plug, each additional peripheral groove being located between the first, second, and third ports and the fourth and fifth ports; and (d) means for sealing against fluid passage located in each of the peripheral grooves.

In an exemplary valve of the present invention, (a) the bore in the valve terminates at a shoulder proximate a first end of the valve, the shoulder having a first cylindrical passage therein; and (b) the bore terminates at an opening in a second end of the valve body. In this exemplary embodiment, the valve further comprises (i) a first cylindrical shaft coaxially attached to the first end of the plug, the first shaft coaxially transversing the first passage; (ii) a second cylindrical shaft coaxially attached to a second end of the plug; (iii) a first washer positioned between the shoulder and the first end of the plug and between an outside surface of the first shaft and the inside surface of the bore; (iv) first means for reducing friction positioned between the outside surface of the first shaft and an inside surface of the first passage; (v) a cover plate removably attached to the second end of the valve body, the cover plate having a second cylindrical passage therein. the second shaft coaxially transversing the second passage; (vi) a second washer positioned between an inside surface of the cover plate and the second end of the plug and an outside surface of the second shaft and the inside surface of the bore; and (vii) second means for reducing friction positioned between the outside surface of the second shaft and an inside surface of the second passage.

DRAWINGS

These and other features, aspects, and advantages of the present invention will become better understood from the following description, appended claims, and accompanying drawings where:

FIG. 2 is an oblique elevational perspective view of a valve embodying features of the present invention within region 2 of FIG. 1; and FIG. 3 is a fragmentary sectional view of the valve of FIG. 2 embodying features of the present invention.

DESCRIPTION

Figure 1:
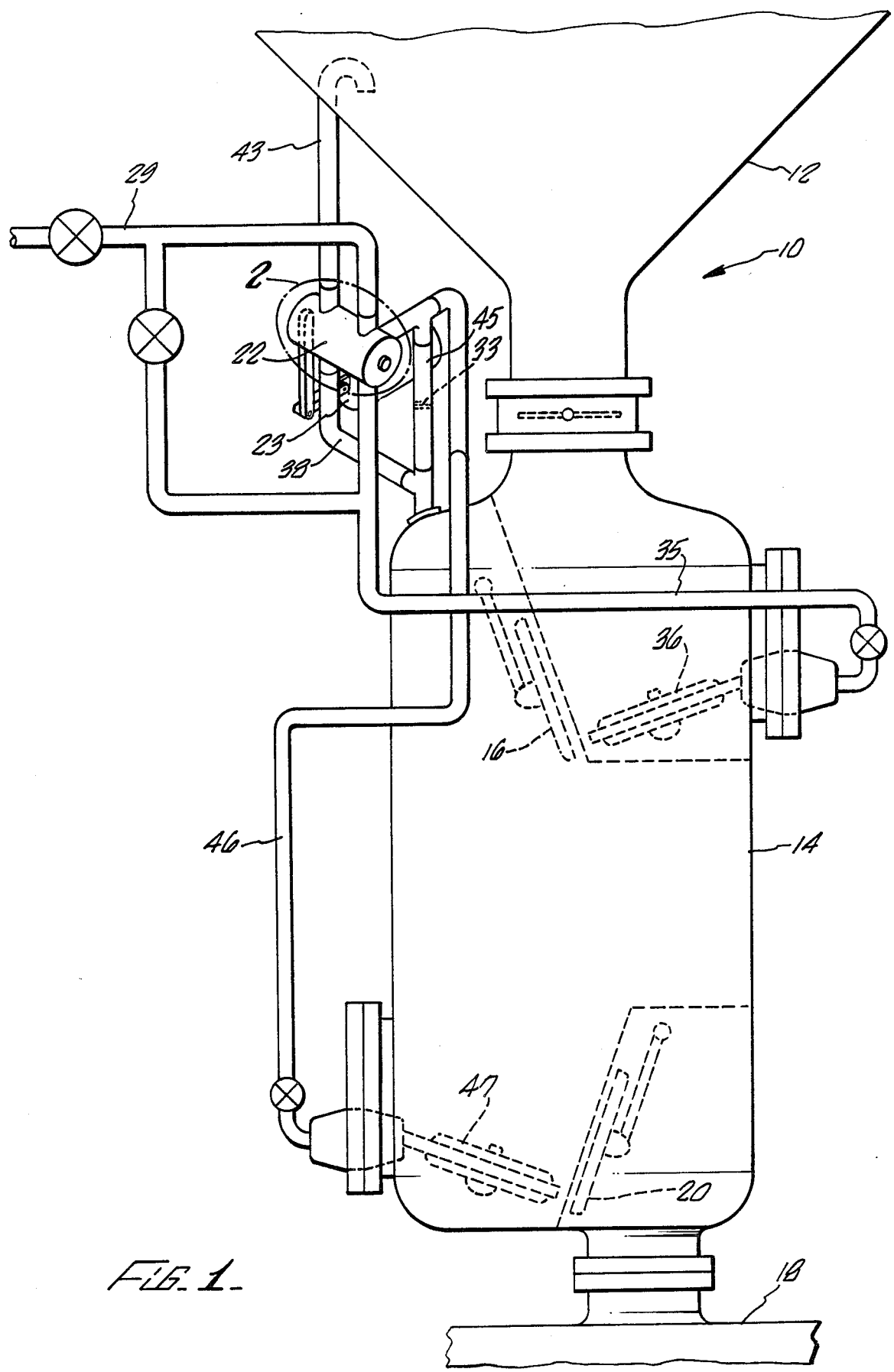
FIG. 1 is a schematic representation of a system for transporting fly ash embodying features of the present invention.

The present invention is directed to a system and method for the transport of fly ash and other particulate materials to a valve for use in such system and method. Because of the high reliability of the valve employed in the system and method of the present invention, the system of the present invention exhibits less down time and improved operating efficiency than prior art systems not employing the valve. Furthermore, the valve employed in the system and method of the present invention is also easy to maintain.

With reference to the figures, a system 10 for managing the transport of fly ash embodying features of the invention comprises a fly ash hopper 12 and a metering container 14 for measuring the amount of fly ash to be transported. A first valve 16 regulates the movement of fly ash between the hopper 12 and the metering container 14. A transport line 18 transports the fly ash out of the metering container 14. A second valve 20 regulates the movement of fly ash between the metering container 14 and the transport line 18. A third valve 22 regulates venting and pressurization of the metering container 14. Movement means 23 move the plug between a first position A and a second position B.

The third valve 22 comprises a valve body 24 having a bore 26 and five ports 30, 34, 37, 39, and 42 in communication with the bore 26. A plug 28 is movably mounted in the bore 26 between the first and second positions A and B, respectively. The plug 28 has passages therethrough. When the plug 28 is in the first position A, pressurized air flows from a gas supply line 29 into a first port 30, through a first passage 32, out a second port 34, through a first connecting line 35, out a first ash fluffing device 36, and into the metering container 14 to fluidize fly ash in the metering container 14. The fly ash drops out of the hopper 12, through the first valve 16, and into the metering container 14. Passage of pressurization gas through a third port 37 is prevented by one-way valve 33 and gas in the metering container 14 is vented through a fourth line 38 to a fourth port 39, through a second passage 40 in the plug 28, through a fifth port 42, and through a fifth lin 43 into the hopper 12 to allow the fly ash to flow into the metering container 14. The plug 28 can be moved into a second position B in the valve body 24. When the plug 28 is in the second position B in the valve body 24, gas passage is prevented through the second port 34, the fourth port 39, and the fifth port 42, and pressurization gas flows from the gas supply line 29 into the first port 30, through a third passage 44. and out the third port 37. From the third port 37 pressurization gas flows a through a third line 45. past the one-way valve 33, and into the metering container 14 to pressurize the metering container 14 and (b) through a side line 46 and out a second ash fluffing device 47 to fluidize the ash so that the fly ash drops out of the metering container 14 and into the transport line 18 when th second valve 20 is opened.

In an exemplary third valve 22 of the present invention, the first port 30 and second port 34 are diagonally located from each other. In addition, the third port 37 is located between the first port 30 and the second port 34. In this embodiment, the fourth port 39 and the fifth port 42 are also diagonally located from each other. For ease of manufacture, the third port 37 is preferably located equidistant between the first and second ports 30 and 34, respectively, and the first, second, fourth, and fifth ports 30, 34, 39, and 42, respectively, are substantially coplanar.

The cross-sectional area of the bore 26 in the valve body 24 as well as the cross-sectional area of the plug 28 can vary. An exemplary cross-sectional area is circular. Typically, the bore 26 and the plug 28 are of a matingly cylindrical or conical configurations.

Means 48 for sealing prevent fluid passage out of the bore 26 other than through the ports 30, 34, 37, 39, and 42. An exemplary sealing means 48 is shown in FIGS. 2 and 3. As shown, the exemplary sealing means 48 comprises a first peripheral groove 49 in the plug 28. The first peripheral groove 49 is located between a first end 50 of the plug 28 and the first, second, and third ports 30, 34, and 37, respectively. The exemplary sealing means 48 also comprises a second peripheral groove 52 in the plug 28. The second peripheral groove 52 is located between a second end 54 of the plug 28 and the fourth and fifth ports 39 and 42, respectively. In addition, the exemplary sealing means 48 also comprises at least one additional peripheral groove 56 in the plug 28. Each additional peripheral groove 56 is located between the first, second and third ports 30, 34, and 37, respectively, and the fourth and fifth ports 39 and 42, respectively. Means 58 for sealing against fluid passage are located in each of the peripheral grooves 49, 52 and 56. An O-ring is an exemplary means 58 for sealing against fluid passage. Two such additional peripheral grooves 56 are shown in FIGS. 2 and 3.

As shown in FIG. 3, in an exemplary third valve 22 of the present invention, the bore 26 in the valve body 24 terminates at a shoulder 60 proximate a first end 62 of the valve body 24. The shoulder 60 has a first cylindrical passage 64 therein. The bore 26 also terminates at an opening 68 in a second end 66 of the valve body 24. In this exemplary embodiment, the third valve 22 further comprises a first cylindrical shaft 70 coaxially physically attached to the first end 50 of the plug 28. The first cylindrical shaft 70 coaxially traverses the first cylindrical passage 64. A second cylindrical shaft 72 is coaxially physically attached to the second end 54 of the plug 28. A first washer 74 is positioned between the shoulder 60 and the first end 50 of the plug 28 and between an outside surface 76 of the first shaft 70 and an inside surface 78 of the bore 26. First means 80 for reducing friction are positioned between the outside surface 76 of the first shaft 70 and an inside surface 82 of the first passage 64. A cover plate 84 is removably attached to the second end 66 of the valve body 24. The cover plate 84 has a second cylindrical passage 86 therein. The second shaft 72 coaxially traverses the second cylindrical passage 86. A second washer 88 is positioned between an inside surface 90 of the cover plate 84 and the second end 54 of the plug 28 and an outside surface 92 of the second shaft 72 and the inside surface 78 of the bore 26. Second means 94 for reducing friction are positioned between the outside surface 92 of the second shaft 72 and an inside surface 96 of the second passage 86. Exemplary first and second means for reducing friction 80 and 94, respectively, are bushings.

The valve body 24, plug 28, cover plate 84, and first and second bushings 80 and 94, respectively, can be fabricated from materials such as aluminum, stainless steel, and bronze. For excellent longevity, it is preferred that the valve body 24 be aluminum, that the plug 28 be stainless steel, and that the bushings 80 and 94 be either aluminum bronze or oilite (a porous brass impregnated with oil). The washers 74 and 88 are typically made of Teflon TM synthetic resin polymers and the O-rings 58 are typically made of neoprene.

The valve 22 is highly reliable and easy to maintain. To inspect the valve 22 there is no need to disconnect any joints since the entire valve 22 need not be removed from the system. All that needs to be done is to take off the cover plate 84, disconnect the lower arm 98, and pull out the plug 28. The total time necessary to inspect, repair, and replace the valve 22 is only about one man hour.

The performance of valve 22 of the present invention has been demonstrated to markedly exceed the performance of the prior art five-way, triple diaphragm operated valve in terms of longevity, reliability, and ease of maintenance.

Although the present invention has been described in considerable detail with reference to certain preferred versions thereof, other versions are possible. For example, the apparatus, system and valve of the present invention can be used in the transport of other particulate matter such as food grains and solid chemicals. Therefore, the spirit and scope of the appended claims should not be limited to the description of the preferred versions contained herein.

What is claimed is:

1. A system for managing the transport of a particulate comprising
   (a) a particulate ash hopper;
   (b) a metering container for measuring the amount of particulate to be transported;
   (c) a first valve for regulating the movement of particulate between the hopper and the metering container,
   (d) a transport line for transporting particulate out of the metering container;
   (e) a second valve for regulating the movement of particulate between the metering container and the transport line;
   (f) a third valve for regulating venting and pressurization of the metering container, the third valve comprising:
   (i) a valve body having a bore and five ports in communication with the bore;
   (ii) a plug movably mounted in the bore between first and second positions, the plug having passages therethrough so that when the plug is in the first position (A) pressurization gas can flow into the first port, through a first passage, and out the second port into the metering container to fluidize particulate therein so that particulate can drop out of the hopper, through the first valve, and into the metering container, (B) passage of pressurization gas through the third port is prevented, and (C) gas in the metering container is vented through the fourth port, through a second passage, and through the fifth port into the hopper to allow particulate to flow into the metering container; and when the plug is in the second position (A) gas passage is prevented through the second, fourth, and fifth ports and B) pressurization gas flows into the first port, through a third passage, and out the third port into the metering container to pressurize the metering container and fluidize the particulate so that the particulate drops out of the metering container and into the transport line when the second valve is opened; and
   (iii) sealing means for preventing fluid passage out of the bore other than through the ports; and
   (g) means for moving the plug between the first and second positions, the movement means being in physical communication with the third valve.

2. The invention of claim 1 wherein the particulate is fly ash.

3. The invention of claim 2 wherein (a) the first port and the second port are diagonally located from each other, (b) the third port is located between the first and second ports, and (c) the fourth port and fifth port are diagonally located from each other.

4. The invention of claim 3 wherein (a) the third port is located equidistant between the first and second ports and (b) the first, second, fourth, and fifth ports are substantially coplanar.

5. The invention of claim 2 wherein the plug and the bore in the valve body have a circular cross-sectional area.

6. The invention of claim 5 wherein the plug and the bore are cylindrical.

7. The invention of claim 5 wherein the plug and the bore are conical.

8. The invention of claim 2 wherein the sealing means comprises:
   (a) a first peripheral groove in the plug, the first peripheral groove being located between a first end of the plug and the first, second, and third ports;
   (b) a second peripheral groove in the plug, the second peripheral groove being located between a second end of the plug and the fourth and fifth ports;
   (c) at least one additional peripheral groove in the plug, each additional peripheral groove being located between the first, second, and third ports and the fourth and fifth ports; and
   (d) means for sealing against fluid passage located in each of the peripheral grooves.

9. The invention of claim 8 wherein:
   (a) the bore in the valve body terminates at a shoulder proximate a first end of the valve body, the shoulder having a first cylindrical passage therein; and
   (b) the bore terminates at an opening in a second end of the valve body; and the valve further comprises:
   (i) a first cylindrical shaft coaxially attached to a first end of the plug, the first shaft coaxially traversing the first passage;
   (ii) a second cylindrical shaft coaxially attached to a second end of the plug;
   (iii) a first washer positioned between the shoulder and the first end of the plug and between an outside surface of the first shaft and an inside surface of the bore;
   (iv) first means for reducing friction positioned between the outside surface of the first shaft and an inside surface of the first passage;

(v) a cover plate removably attached to the second end of the valve body, the cover plate having a second cylindrical passage therein, the second shaft coaxially traversing the second passage;

(vi) a second washer positioned between an inside surface of the cover plate and the second end of the plug and an outside surface of the second shaft and the inside surface of the bore; and (vii) second means for reducing friction positioned between the outside surface of the second shaft and an inside surface of the second passage.

10. A method for managing the movement of particulate from a particulate hopper through a first valve into a metering container for measuring the amount of particulate to be transported, and from the metering container through a second valve into a transport line for transporting particulate out of the metering container, the method comprising:

(a) moving a plug in a third valve for regulating venting and pressurization of the metering container into a first position, the third valve comprising a valve body having (i) a bore and five ports in communication with the bore;

(ii) a plug movably mounted in the bore between first and second positions, (iii) sealing means for preventing fluid passage out of the bore other than through the ports; wherein in the first position (A) pressurization gas can flow into the first port, through a first passage, and out the second port into the metering container to fluidize particulate therein so that particulate can drop out of the hopper, through the first valve, and into the metering container, (B) passage of pressurization gas through the third port is prevented, and (C) gas in the metering container is vented through the fourth port, through a second passage, and through the fifth port into the hopper to allow particulate to flow into the metering container; and (b) moving the plug to a second position in the valve bosy whereby (A) gas passage is prevented through the second, fourth, and fifth ports and (B) pressurization gas flows into the first port, through a third passage, and out the third port into the metering container to pressurization the metering container and fluidize the particulate so that the particulate drops out of the metering container and into the transport line when the second valve is opened.

11. A multiple inlet, multiple outlet rotary plug valve useful in managing the movement of a particulate from a hopper into a metering container and from the metering container into a particulate transport line, the valve comprising:

(a) a valve body having a first set of ports and a second set of ports, the first set comprising a first port, a second port, and a third port, the second set of ports comprising a fourth port and a fifth port;

(b) a bore in the valve body. the bore communicating with each port;

(c) a plug matingly and movably mounted in the bore between a first and a second position, the plug having (i) a first passage capable of placing the first, second, and third ports in fluid communication with each other; and (ii) a separate second passage capable of placing the fourth and fifth ports in the fluid communication with each other; and (d) sealing means for preventing fluid passage out of the bore other than through the ports; whereby when the plug is in the first position (A) pressurization gas can flow into the first port, through the first passage, and out the second port into the metering container to fluidize particulate therein so that fly ash can drop out of the hopper, through a first valve for regulating the movement of particulate between the hopper and the metering container, and into the metering container (B) passage of pressurization gas through the third port is prevented, and (C) gas in the metering can is vented through the fourth port, through the second passage, and through the fifth port into the hopper to allow particulate to flow iinto the metering can; and when the plug is in the second position (A) gas passage is prevented through the second, fourth, and fifth ports and (B) pressurization gas flows into the first port, through the first passage and out the third port into the metering container to pressurize the metering container and fluidize the particulate so that the particulate can drop out of the metering container and into the transport line when a second valve for regulating the movement of particulate between the metering container and the transport line is opened.

* * * * *

UNITED STATES PATENT AND TRADEMARK OFFICE
CERTIFICATE OF CORRECTION

PATENT NO. : 4,776,730

DATED : Oct. 11, 1988

INVENTOR(S) : William F. NEAREN, et al.

It is certified that error appears in the above-identified patent and that said Letters Patent is hereby corrected as shown below:

In the heading, under "Related U. S. Application Data," delete "Continuation of Ser. No. 6,486, Jan. 28, 1987" and substitute therefor --Continuation-in-part of Ser. No. 6,486, Jan. 23, 1987--.

Signed and Sealed this

Nineteenth Day of December, 1989

Attest:

JEFFREY M. SAMUELS

*Attesting Officer*   *Acting Commissioner of Patents and Trademarks*